G. A. JACKSON.
MECHANICALLY OPERATED FAN.
APPLICATION FILED AUG. 7, 1911.

1,037,258.

Patented Sept. 3, 1912.
2 SHEETS—SHEET 1.

Witnesses;
H. B. Davis.
J. L. O'neill

Inventor;
George A. Jackson
By Wayes Tamman
atty

G. A. JACKSON.
MECHANICALLY OPERATED FAN.
APPLICATION FILED AUG. 7, 1911.
1,037,258.
Patented Sept. 3, 1912.
2 SHEETS—SHEET 2.
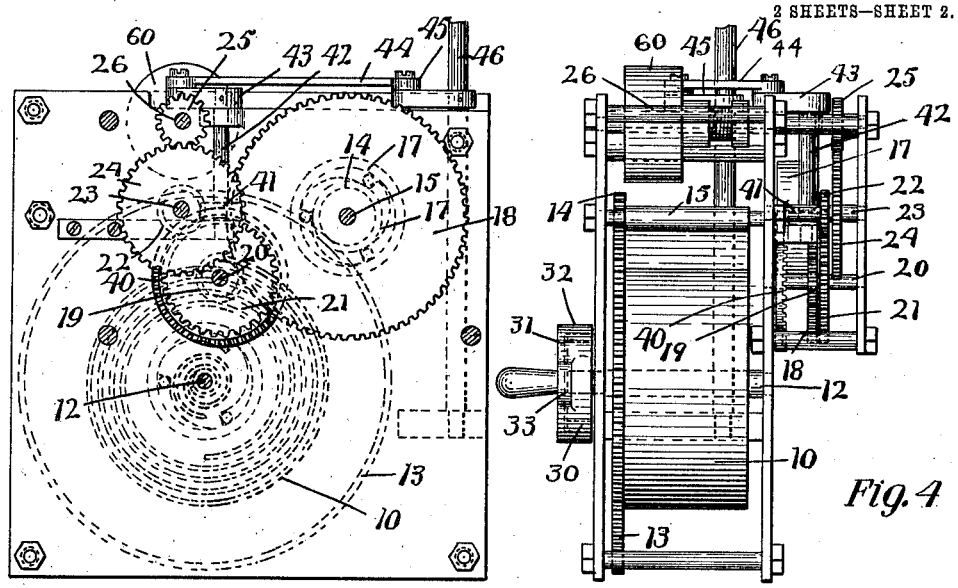
Fig. 3.
Fig. 4.
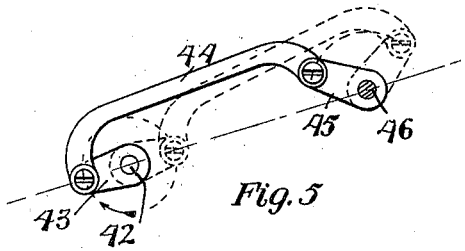
Fig. 5.
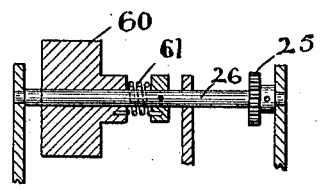
Fig. 6.
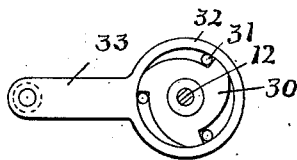
Fig. 7.
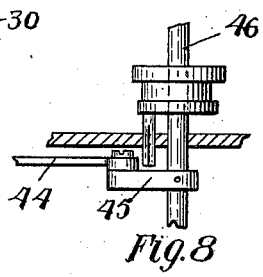
Fig. 8.
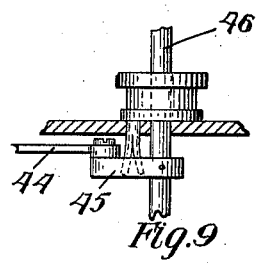
Fig. 9.
Witnesses:
H. B. Davis
J. L. Orrell
Inventor:
George A. Jackson
By Ayres & Harrison
Attys.

UNITED STATES PATENT OFFICE.

GEORGE A. JACKSON, OF NEWTON, MASSACHUSETTS, ASSIGNOR TO MYLES McCABE, OF BOSTON, MASSACHUSETTS.

MECHANICALLY-OPERATED FAN.

1,037,258. Specification of Letters Patent. Patented Sept. 3, 1912.

Application filed August 7, 1911. Serial No. 642,831.

*To all whom it may concern:*

Be it known that I, GEORGE A. JACKSON, a citizen of the United States, residing at Newton, in the county of Middlesex and State of Massachusetts, have invented an Improvement in Mechanically - Operated Fans, of which the following is a specification.

This invention relates to mechanically operated fans, and has for its object the production of means to mechanically oscillate a fan in such manner that it is caused to attain its greatest speed along the middle of its stroke, whereby it is caused to produce repeatedly forcible drafts as contrasted with a steady draft, and to provide the motor with a governor which is loosely connected with one of its shafts whereby the quickly oscillated fan may be stopped and started suddenly at the ends of its stroke, substantially noiselessly, and without jar, which it would not do if the governor was rigidly connected with the motor, the essential aim being to make the apparatus as noiseless as possible, and yet afford repeated forcible drafts.

Figure 1:
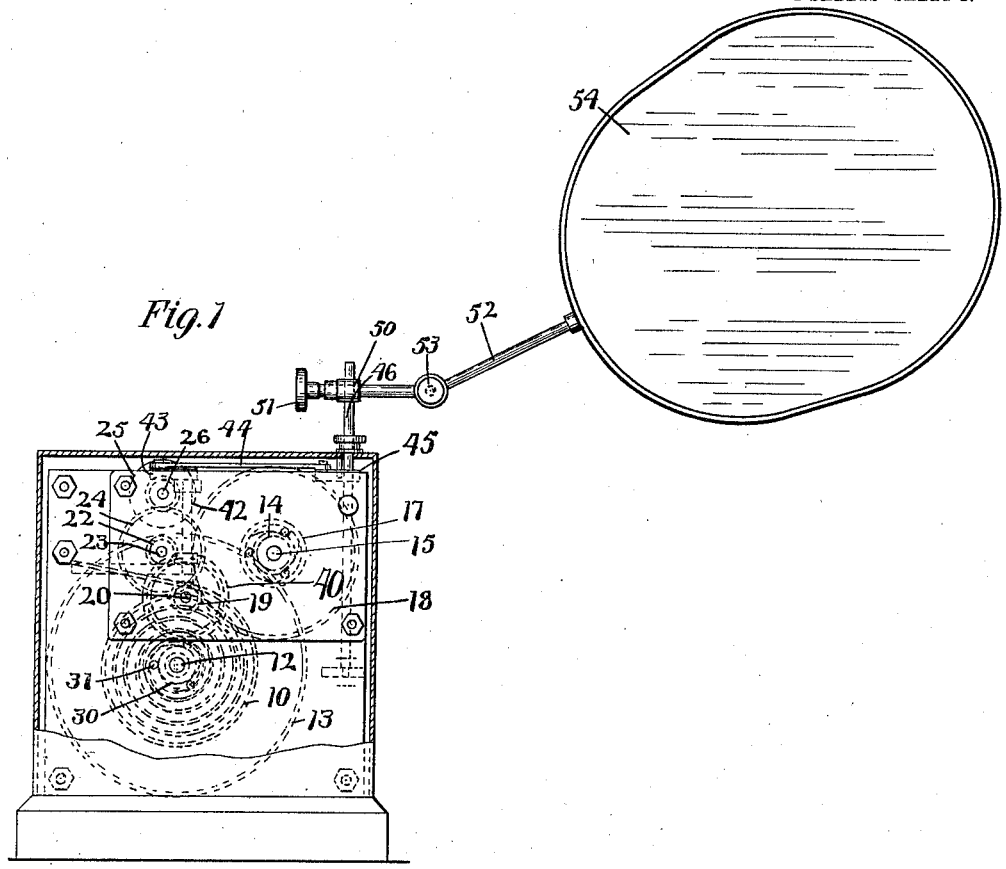
Figure 2:
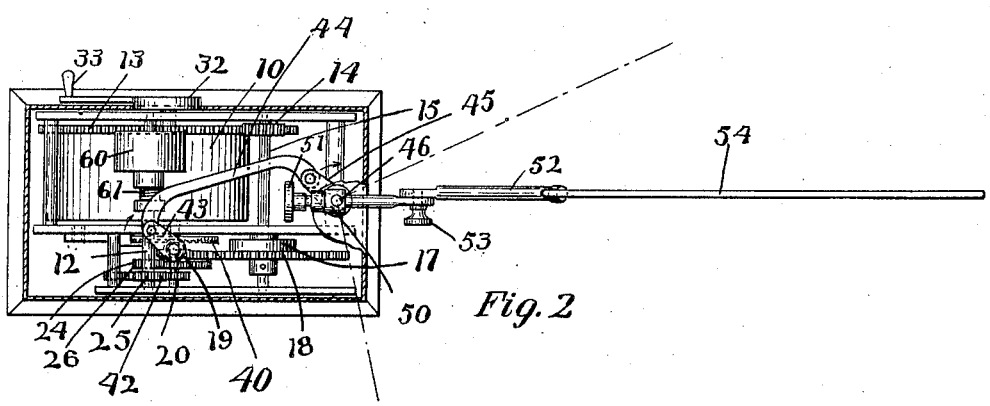

Figure 1 is a front elevation of a mechanically operated fan embodying this invention. Fig. 2 is a plan view, the case being shown in section. Fig. 3 is an enlarged front elevation of the motor. Fig. 4 is a side elevation of the motor. Fig. 5 is a detailed view of the connecting-means between the oscillating-shaft for the fan and a revolving-shaft of the motor. Fig. 6 is a sectional detailed view of the governor and its shaft. Fig. 7 is a detail view of the noiseless ratchet winding-device. Figs. 8 and 9 are detail views of the stop for the motor.

The spring motor here shown comprises a main spring 10, connected with a winding-shaft 12, bearing a large gear 13, which engages a pinion 14, secured to a shaft 15, which is connected through a suitable clutch 17, with a large gear 18, which engages a pinion 19, secured to a shaft 20, bearing a gear 21, which engages a pinion 22, secured to a shaft 23, bearing a gear 24, which engages a pinion 25, secured to a shaft 26, bearing the governor 60. All of said shafts are suitably supported by the walls of the frame. The clutch 17 is employed for the purpose of permitting the winding-shaft to be turned backward for the purpose of winding the spring, and said clutch, as here shown, comprises a recessed member secured to the shaft 15, and balls or rolls arranged in the recess thereof, and a circular rim on the gear 18 inclosing said recessed-member and the balls or rolls. Such form of clutch is like unto an ordinary friction clutch, and by itself forms no part of my invention.

The noiseless winding-device embodies a similarly constructed clutch, and referring to Fig. 7, wherein said noiseless winding-device is shown, 30 represents the recessed-member arranged on the winding-shaft 12, and may be rigidly or detachably connected to said shaft, and 31, the balls or rolls arranged in the recesses of said member, and 32 a circular rim inclosing the recessed-member and the balls or rolls, said rim having a handle 33 extended radially from it by which it may be moved rotarily in one direction to cause the balls or rolls to frictionally bind between the recessed-member and the rim, to thereby turn the shaft 12, for the purpose of winding the spring, yet said clutch permits movement of its recessed-member freely in the opposite direction as the spring unwinds. Movement of the motor is controlled by the fan which acts in the nature of an escapement for it, and, as here shown, a face or crown-gear 40 is secured to the shaft 20 of the motor, which engages a pinion 41 secured to the upright shaft 42, bearing at its upper end a radially extended arm 43, and to the extremity of said arm one end of a link 44 is loosely connected, the other end of which is loosely connected to the extremity of an arm 45, extended radially from and secured to an upright shaft 46, having at its lower end a step-bearing by which it is supported. Said shaft 46, serves as the fan-carrying shaft, and, as represented in Fig. 1, an arm 50 is arranged on said shaft and extended radially therefrom which is vertically and also rotarily adjustable thereon, being held in different elevated positions by a set-screw 51, and to the end of said arm 50 an arm 52 is pivoted, as at 53, and said arm 52 bears a fan 54, which is of any suitable construction and dimensions. Adjustment of the arm 50 to different elevations and also rotarily about the upright shaft 46 as an axis admits of the fan being arranged in many different positions.

In operation the motor is designed to operate continuously and the shaft 42 to be revolved continuously by it, and the shaft 46, is oscillated repeatedly by its connection with the continuously revolving-shaft 42, so that the fan is repeatedly oscillated and acts as a controller or regulator for the motor. The connection of the link with the continuously revolving-shaft is in the nature of a crank, forming a crank-motion, and the arm 45, which is connected with the oscillating-shaft, is extended radially therefrom, and is arranged to be moved back and forth by the crank-connection through a part of a cycle, as for instance, a little more than ninety-degrees, but the arrangement is such that movement of the arm 45, to operate the fan takes place while the crank is moving through the quickest portion of its cycle, hence the speed of motion of the fan is greatest during the middle portion of its stroke, such speed of motion gradually decreasing toward the ends of its stroke, so that repeated forcible drafts are produced which gives to the device its most important characteristic.

I do not desire to limit my invention to the particular structure here shown for moving the oscillating-shaft by the motor when including a crank motor.

As the fan arrives at either end of its stroke the crank-connection with the shaft 42 is passing its "dead center," and to prevent noise at this moment the governor 60, which is provided on the shaft 26, is loosely connected with said shaft, as for instance, a spring 61, is interposed between it and the shaft so that the noise which is ordinarily produced by the click of the gears and which is caused by the momentum of the governor is reduced to the minimum, yet the quickly oscillating fan is stopped and started suddenly. A suitable stop will be provided for the motor which is arranged to be operated by hand to stop and start the motor at will.

Referring to Figs. 8 and 9, showing particularly the stop for the motor, 65 represents a sleeve slidably arranged on the shaft 46, or it may be otherwise supported, having on its under side a pin 66 which extends down through a hole in the top wall of the case, and pin is split at the end to form legs which have a normal tendency to spread, as shown in Fig. 9, so as to frictionally engage the edges of the hole in the case to hold the sleeve in elevated position, as represented in Fig. 8. Said pin is made long enough to enter the path of movement of the arm 45, or some other moving part of the motor-mechanism, and thus obstruct it to stop the motor. Said sleeve may be moved up and down on the shaft 46 by hand to start and stop the motor at will.

I claim:—

The combination with a motor, of an oscillating-shaft, a fan carried by said shaft, and means including a crank-motion to connect said oscillating-shaft with a shaft continuously driven by the motor, the fan being thus oscillated by the motor and at the same time controlling its movement and a governor loosely connected with one of the shafts of the motor, whereby the fan is caused to stop and start suddenly at the ends of its stroke substantially noiselessly, substantially as described.

In testimony whereof, I have signed my name to this specification, in the presence of two subscribing witnesses.

GEORGE A. JACKSON.

Witnesses:
 B. J. NOYES,
 H. B. DAVIS.

Copies of this patent may be obtained for five cents each, by addressing the "Commissioner of Patents, Washington, D. C."